Patented June 2, 1925.

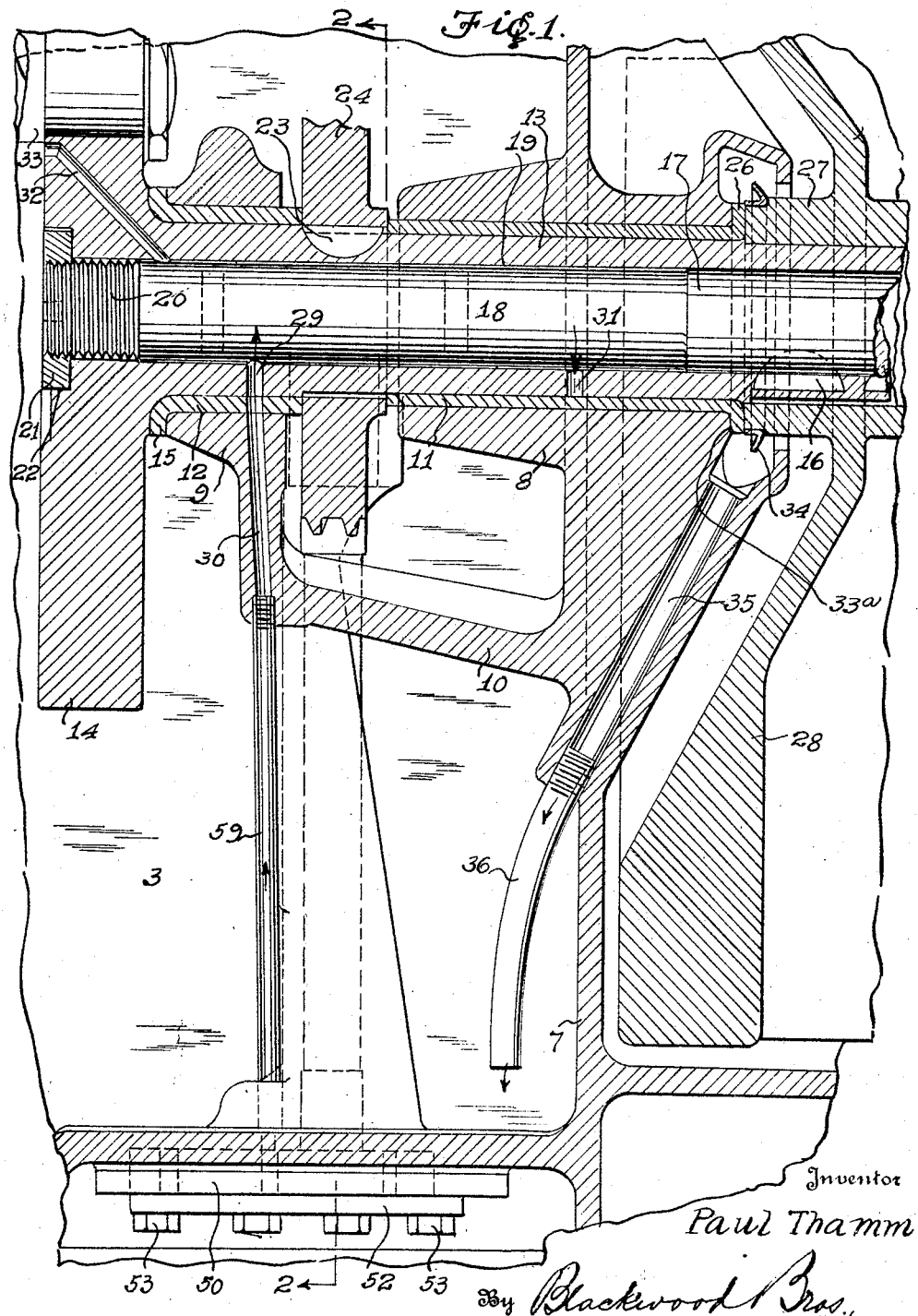

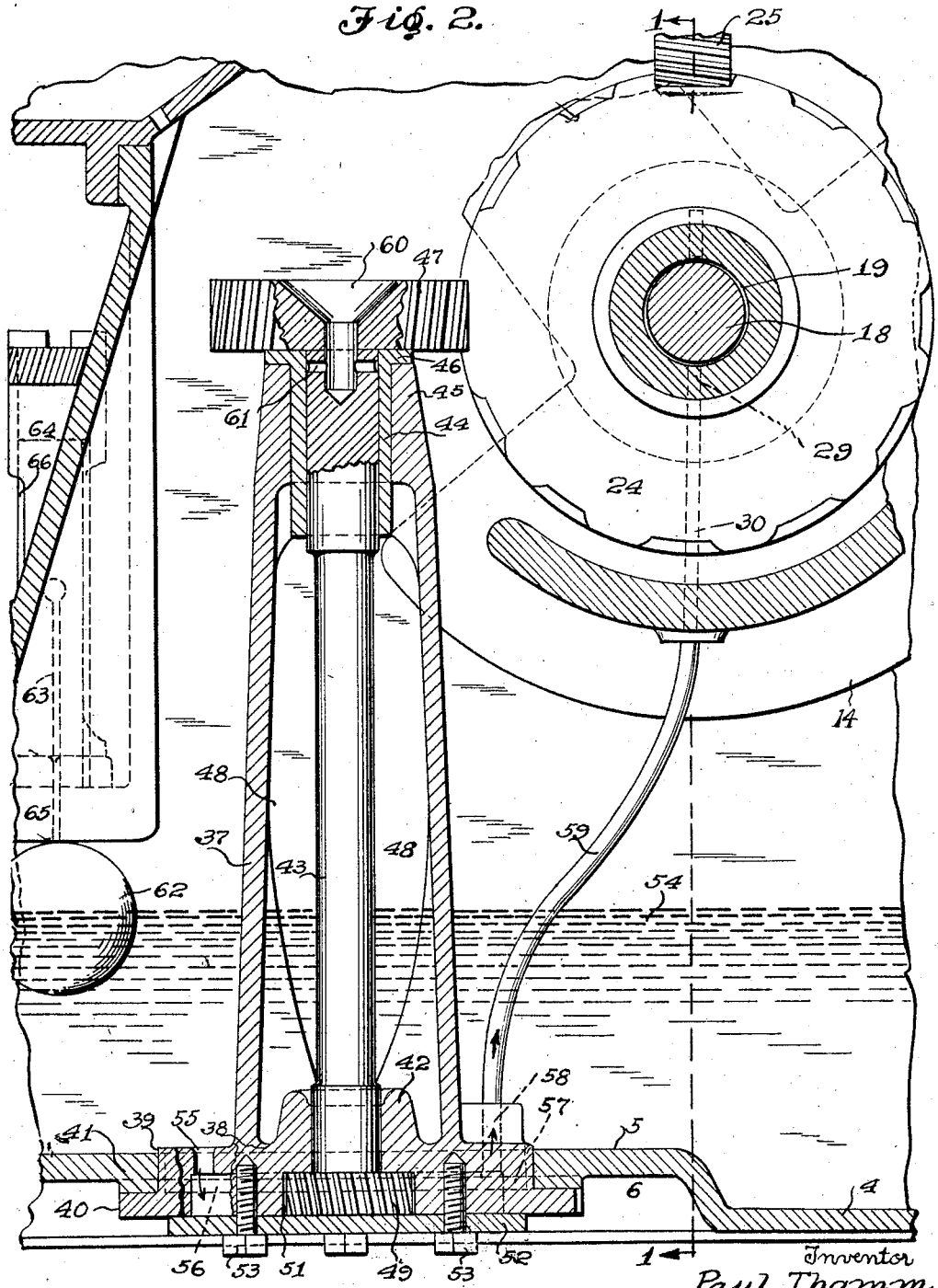

1,540,577

UNITED STATES PATENT OFFICE.

PAUL THAMM, OF NEW YORK, N. Y., ASSIGNOR, BY MESNE ASSIGNMENTS, TO C. BLAIR WOODROW.

LUBRICATING DEVICE.

Substitute for application Serial No. 384,949, filed May 28, 1920. This application filed December 27, 1922. Serial No. 609,345.

*To all whom it may concern:*

Be it known that I, PAUL THAMM, residing at New York city, in the county of New York and State of New York, a citizen of the United States, have invented certain new and useful Improvements in Lubricating Devices; and I do hereby declare the following to be a full, clear, and exact description of the invention, such as will enable others skilled in the art to which it pertains to make and use the same.

My present invention relates to certain features of improvement in a lubricating system for a counterbalanced crank-shaft and bearing, designed particularly for use in connection with my improved light and power plant, for which an application for Letters Patent of the United States was filed on April 21st, 1920, Serial No. 375,626—allowed, Dec. 28th, 1920—renewed, Dec. 2d, 1921, and allowed December 21st, 1921, Serial No. 519,081; such parts having been especially designed to admit of the employment of a novel method and of an apparatus or means for their positive and thorough lubrication, and this application is a substitute for my application filed May 28, 1920, Serial No. 384,949.

More specifically the invention relates to a crank-shaft and bearing assembly, etc., consisting of an inner shaft, to which is keyed an outer shaft which turns in bearings, the inner shaft having a reduced portion to provide an oil space, and the outer shaft having openings in communication with such oil space to permit the forced circulation of the oil, the forced circulation being accomplished by means of a gear driven pump operative at the lowest point of the oil reservoir or crankcase, the circulation system also embodies an assembly of parts and an arrangement of oil ducts whereby the oil, after being forced into the space between the shafts, is distributed to and lubricates the shaft bearings, the connecting rod bearing, gear connections, the pump shaft and other working parts within the crankcase.

Other objects and advantages will be set forth in the following specification; and the preferred embodiment of the invention is illustrated in the accompanying drawings, forming a part of this application, and in which:—

Fig. 1 is a vertical longitudinal section through a crank-case, showing my improvements, the crank-case being fractionally shown, and the section being taken on the line 1—1 of Fig. 2.

Fig. 2 is a cross section, taken on the line 2—2 of Fig. 1.

The same reference characters represent the same parts in both views.

The numeral 3 designates a crank-case (fractionally shown), which also serves as an oil reservoir. The bottom plate 4 of this crank-case is formed or cast with an inwardly offset portion 5 to produce a space 6 for accommodating the parts of the oil pump, as will hereinafter appear. One side wall 7 of the crank-case is provided with the main bearings 8 and 9, the latter bearing being spaced from the former and being formed on the upper end of the angular arm 10, which projects as shown from an enlarged portion of the side wall 7 below the said bearing 8.

The bearings 8 and 9 are fitted interiorly with bearing linings 11 and 12, respectively, made preferably of Babbitt or other metal suitable for the purpose of reducing friction at that point. Extending through and rotatable in the bearing linings 11 and 12, is a tubular crank-shaft 13 with which is formed at the end of the bearing lining 12, a counterbalanced crank 14, the bearing lining 12 being made with an annular flange 15 intermediate the bearing 9 and the counterbalanced crank. Arranged within and keyed at 16 to the shaft 13, so as to revolve therewith, is an inner shaft 17, a considerable portion 18 of which is of smaller diameter than the interior of the shaft 13 in order to provide an annular oil space 19 around the shaft portion 18. Within the counterbalanced crank 14, the reduced portion 18 of the inner shaft is provided with a screw-threaded portion 20, on which is threaded a lock-nut 21, of polygonal or other non-circular form, countersunk in a corresponding opening 22 provided in the face of the counterbalanced crank.

Between the Babbitt metal bearings 11 and 12, there is keyed, as at 23, to the outer shaft 13 a helical gear 24 for driving a helical gear 25 (see Fig. 2), fast on a cam shaft (not shown). The outer end of the Babbitt metal bearing 11 is provided with a flange 26, against which turns the hub 27 of a fan fly-wheel 28, which operates exteriorly of the wall 7 of the crank-case.

Oil is introduced, under pressure, into the oil space 19 through a duct 29, provided through the outer shaft 13, this duct 29, as the shaft revolves being adapted to register with a duct 30 drilled through the bearing parts 9 and 12, as shown. From the oil space 19, a portion of the oil flows through a duct 31, provided in the outer shaft 13 to lubricate the movement of said shaft within the Babbitt metal bearing 11. The shaft 13 turns in the Babbitt metal bearing 12 and is lubricated by the oil that flows, or finds its way, from the duct 30 when the duct 29 is not in register therewith. By the rotary movement of the shaft 13, the oil is worked along the entire length of the Babbitt bearing 12 and flows along the flange 15 thereof onto the counterbalanced crank 14 and oils or lubricates the same, and from which it is distributed by centrifugal action and oils the interior of the crank-case and the other parts therein.

From the oil space 19, the oil also flows through a duct 32 to lubricate the connecting rod bearing 33. At the flanged end 33ª of the Babbitt metal bearing 11, the oil lubricates the hub of the fan fly-wheel 28.

An annular baffle plate 34, which is set in said hub, deflects the escaping or draining oil into a downwardly extending bore 35, whence it flows through a curved pipe 36 into the reservoir 3.

For the purpose of forcing the oil under pressure upwardly through the duct 30 and thence through the duct 29 into the oil space 19, a pump of the gear type is provided, located in the space 6 below the upwardly offset region 5. 37 designates the vertical casing or framing for supporting the operative pump parts, provided at its lower end with a casting 38, which fits tightly within an opening 39, provided for the purpose in the bottom portion 5, and which is provided with a projecting flange 40, designed to fit flat on the underside of the reinforced portion 41. The casting 38 is also made with an upwardly projecting central bearing 42, in which is journaled the lower end of the vertical shaft 43, whose upper end is journaled in a Babbitt metal bearing 44, suitably mounted in an opening provided in the upper end 45. The Babbitt metal bearing 44 is provided with a flange 46, which extends over the upper end of the portion 45, and on the top of this flange 46 is a helical gear 47, formed or cast with the shaft 43, and which is in mesh with the crank-shaft gear 24, by which means the shaft 43 receives its motion. These gear connections 24 and 47 are such that the shaft 43 is driven at one-half engine speed; and the shaft 43 is further braced or supported by means of webs 48, which are formed or cast with casing 37.

Fast on the lower end of the shaft 43 is a helical gear 49, with another gear 50 driven thereby, which is located in a recess 51, suitably provided in the base 38. This recess 51 is closed by a plate 52, secured flat on the underside of the base 38 by means of screw-bolts 53. The oil 54, which is introduced into the crank-case, flows downwardly through an opening 55 and thence through an opening 56 to and between the revolving gears 49 and 50, and is discharged, under pressure, through the openings 57 and 58 into an upwardly extending curved pipe 59, which communicates with the duct 30 in the bearing 9. For lubricating the Babbitt metal bearing 44 of the pump shaft the gear 47 is provided with an inwardly beveled opening 60, into which the oil is deposited centrifugally from the helical gear 24. Leading from this opening 60 are branch openings 61 through which the oil flows to said Babbitt metal bearing 44, and thence flows downwardly and lubricates the entire length of the pump shaft 43.

From the accompanying drawing, it will be noted that the Babbitt metal bearings 11 and 12 afford very extensive bearing surfaces, which are positively and thoroughly lubricated, and this insures that the bearings will last a long time without need for adjustment or replacement. By making the greater portion of the inner shaft 17 of a reduced diameter, and so providing there around an oil space into which the oil is force-fed, each time the duct 29 registers with the duct 30, adequate provision is provided for positively oiling not only the shaft bearings, but also the gearing connections, the connecting rod bearing, and such other working parts as may require continued and constant lubrication in order to produce efficient service.

In order to show at all times the oil level within the crank-case, a ball float 62, is provided to which is attached an upright or vertical rod or tell-tale 63, which projects upwardly into a housing 64, suitably secured in an offset portion 65 provided for the purpose of the crank-case. One side of the housing 64, has a glass plate 66, through which the tell-tale is visualized.

I do not wish to be understood as limiting myself to the specific details of construction and arrangement as herein described and illustrated, as it is manifest that variations and modifications may be made in such features or construction and arrangement, in the adaptation of the device to the various conditions of use, without departing from the spirit and scope of my invention and improvements. I, therefore, reserve the right to all such variations and modifications as properly fall within the scope of my invention and the terms of the following claims:—

What I claim is:—

1. In a lubricating device, inner and outer shafts keyed together, bearings for the outer shaft, said inner shaft being reduced in diameter, for a portion of its length, thereby forming an oil space between said shafts, inlet and outlet ducts in the outer shaft, and an inlet duct in one of the bearings, which establishes communication between the bearing and the oil space, a gear mounted on the outer shaft and keyed thereto located between said bearings, oil forcing means, means forming a communication between the oil forcing means and the inlet duct of the said bearing, for the purpose of force feeding oil into the inlet duct of one of the said bearings.

2. In a lubricating device, inner and outer shafts, bearings for the outer shaft, an oil space between said shafts, inlet and outlet ducts in the outer shaft, an inlet duct in one of the bearings, means for feeding oil under pressure to said inlet duct, an oil reservoir, a fly-wheel, means at the end of one of said bearings for deflecting the oil, after it has lubricated the fly-wheel, into a pipe which in turn delivers or returns the oil to the said reservoir.

3. In a lubricating device, inner and outer shafts, bearings for the outer shaft, the outer ends of each of said bearings being outwardly flanged, an oil space between said shafts, inlet and outlet ducts in the outer shaft, an inlet duct in one of the bearings, means for feeding oil under pressure to said inlet duct, an oil reservoir, a deflector or baffle plate located in proximity to the flanged end of one of said bearings for deflecting or returning the oil to the said reservoir.

4. In a lubricating device, inner and outer shafts, bearings for the outer shaft, an oil space between said shafts, a crank formed on the end of the outer shaft, a connecting rod bearing, an oil duct in the said crank, which forms a communication between the oil space and the bearing for the connecting rod of the said crank by which the bearing for the connecting rod is lubricated and means for supplying oil to the said oil space under pressure.

5. In a lubricating device, inner and outer shafts, a gear on the outer shaft, bearings for the outer shaft, an oil space between said shafts, a pump shaft, a gear thereon meshing with the gear on the said outer shaft and provided with an oil receiver, adapted to be supplied with oil by centrifugal force from the first mentioned gear, and means for distributing the oil from the oil receiver to the pump shaft for the purpose of lubricating said shaft.

6. In a lubricating device, a tubular crank-shaft and a bearing therefor, a shaft fitting within the tubular shaft and keyed thereto, said inner shaft having an extended portion of less diameter than the interior of the tubular shaft to provide an oil space, inlet and outlet ducts in the tubular shaft providing communication between the bearing and the oil space, an inlet duct through the bearing with which the inlet duct in the tubular shaft is adapted to register directly, means driven from one of the shafts for force-feeding oil into the bearing inlet duct, an oil reservoir and means for returning the oil to said reservoir.

7. In a lubricating device, the combination of the inner and outer shafts keyed together, a bearing for the outer shaft, said inner shaft having a portion of less diameter than the interior of the outer shaft to provide an oil space, inlet and outlet ducts in the outer shaft providing communication between the bearing and the oil space, an inlet duct through the bearing with which the inlet duct in the outer shaft registers as the shafts revolve, means for force-feeding oil into the bearing duct with an oil reservoir and means for returning the oil to said reservoir.

8. In a lubricating device the combination of the inner and outer shafts keyed together, spaced-apart bearings for the outer shaft, said inner shaft having a portion of less diameter than the interior of the outer shaft to provide an oil space, inlet and outlet ducts in the outer shaft providing communication between each bearing and the oil space, an inlet duct through one bearing with which the inlet of the outer shaft registers as the shafts revolve, a gear keyed to the outer shaft between said bearings, an oil pump driven from said gear, and a pipe connection between the oil pump and the bearing inlet duct for force-feeding oil thereto, an oil reservoir and means for returning the oil to the reservoir.

9. In a lubricating device a tubular shaft and a bearing therefor, said shaft having at one end a counterbalanced crank including a connecting rod bearing, a shaft fitting within the tubular shaft and keyed thereto, said inner shaft having an extended portion of less diameter than the interior of the tubular shaft thereby to provide an oil space, an inlet duct through the bearing with which the inlet duct in the tubular shaft is adapted to register, a duct leading from the oil space to the connecting rod bearing for lubricating the latter, and means driven from one of the shafts for force-feeding oil into the bearing inlet duct, an oil reservoir and means for returning the oil to the said reservoir.

10. In a lubricating device the combination of the inner and outer shafts keyed together, spaced-apart bearings for the outer shaft, said inner shaft having a portion of less diameter than the interior of the outer shaft to provide an oil space, inlet and outlet ducts in the outer shaft by which communication is established between each bearing and the oil space, an inlet duct through one bearing with which the inlet of the outer shaft registers when the shafts revolve, a gear keyed to the outer shaft between said bearings and lubricated by the oil draining therefrom, a pump shaft with a gear engaged with said outer shaft gear, a housing and oil forcing gears therein driven by said shaft, a pipe connection between the discharge side of said pump and the bearing inlet duct for force-feeding oil into the latter, with an oil reservoir and means for returning the oil to the said reservoir.

11. The combination of a crank-case having a wall with spaced-apart bearings, a tubular crank-shaft rotatable in said bearings, a shaft fitting within the tubular shaft and keyed thereto, said inner shaft having an extended portion of less diameter than the interior of the tubular shaft to provide an oil space, inlet and outlet ducts in the outer shaft providing communication between each bearing and the oil space, an inlet duct through one bearing with which the inlet of the outer shaft registers as the shafts revolve, a gear keyed to the outer shaft between said bearings, an oil pump located at the lowest level of the crank-case, and driven from said gear, and a pipe connection between the oil pump and the bearing inlet duct for force-feeding oil into the latter, an oil reservoir and means for returning the oil to said reservoir.

12. In a lubricating device, inner and outer shafts, keyed to rotate in unison, bearings for the outer shaft, an oil space between said shafts, inlet and outlet ducts in the outer shaft, an inlet duct on one of the bearings, an oil reservoir, and deflecting means located in proximity to one end of one of said bearings for deflecting and returning oil to said reservoir.

In testimony whereof I have affixed my signature.

PAUL THAMM